United States Patent Office 2,700,689
Patented Jan. 25, 1955

2,700,689

DISPROPORTIONATION OF MONO- AND DI-TERTIARY-BUTYLBENZENES

David A. McCaulay, Chicago, Ill., and Arthur P. Lien, Highland, Ind., assignors to Standard Oil Company, Chicago, Ill., a corporation of Indiana No Drawing. Application March 9, 1953,
Serial No. 341,368

15 Claims. (Cl. 260—668)

This invention relates to a novel process for the conversion of mono- and di-t-butylbenzenes by treatment thereof with liquid hydrogen fluoride and boron trifluoride under controlled conditions. More particularly, the present invention relates to low temperature conversions of mono- and di-t-butylbenzenes to produce 1,3-di-t-butylbenzene and a new chemical compound, viz. 1,3,5-tri-t-butylbenzene.

Only one process has thus far been developed for the synthesis of 1,3-di-t-butylbenzene, specifically, the process of alkylating benzene with isobutylene in the presence of $AlCl_3$–HCl at temperatures of at least 130° F., as described in U. S. Patent 2,429,691 of Carl E. Johnson and Chester E. Adams, patented October 28, 1947. To our knowledge, no process has heretofore been described for the preparation of 1,3,5-tri-t-butylbenzene and, so far as the literature indicates, this is a new compound. M. Senkowski (Ber. 23, 2412 (1890)) supposedly prepared a tri-butylbenzene by the reaction of benzene with a mixture of isobutyl- and t-butyl chlorides in the presence of aluminum chloride but the reported properties of Senkowski's product, viz. the melting point of 128° C. and boiling point of 291–2° C./736.6 mm. of mercury are substantially different from those obtained by us for 1,3,5-tri-t-butylbenzene. V. Ipatieff et al. (J. Am. Chem. Soc. 58, 921 (1936)) have reported the synthesis of so-called tri-t-butylbenzenes by the alkylation of benzene with isobutylene in the presence of 96 percent sulfuric acid. The properties of the reported tri-t-butylbenzenes are substantially different from the properties of 1,3,5-tri-t-butylbenzene and a later and more extended re-examination of the subject of benzene alkylation by isobutylene in the presence of $AlCl_3$ and of concentrated sulfuric acid, respectively, by D. I. Legge (J. Am. Chem. Soc. 69, 2079 (1947)) has shown that the supposed tri-butylbenzenes were, in reality, other dialkylbenzenes (1-t-octyl-4-t-butyl-benzenes) and it was found impossible to prepare tri- and tetra-t-butylbenzenes by these alkylation methods.

One object of the present invention is to provide a novel process for the preparation of 1,3-di-t-butylbenzene. Another object of this invention is to provide a novel process for the preparation of 1,3,5-tri-t-butylbenzene. An additional object is to provide the art with novel processes for the efficient conversion of mono- and di-t-butylbenzenes at low temperatures in the presence of HF–$BF_3$ catalysts. Still another object is to provide a process for the conversion of p-di-t-butylbenzene in high yield to 1,3,5-tri-t-butylbenzene and a smaller, but important, yield of 1,3-di-t-butylbenzene. These and other objects of our invention will become apparent from the ensuing description thereof.

Briefly, we have found that mono- and di-t-butylbenzenes can be readily disproportionated by a substantial molar excess of liquid, substantially anhydrous, hydrogen fluoride together with $BF_3$ in proportions between about 0.3 and about 0.6 mol or more per mole of t-butyl groups in the feed stock at temperatures below about +15° C., preferably 0° C. or lower, to 1,3-di-t-butylbenzene and 1,3,5-tri-t-butylbenzene. The disproportionation of mono- and di-t-butylbenzenes and isomerization of the di- and tri-t-butylbenzenes occurs with great facility and in high yields at the temperatures employed in the practice of our invention. The control of temperature, contact time and $BF_3$ concentration is of great importance in effecting the present process, as will be shown in detail hereinafter, and the desired results are not obtained at substantially higher temperatures than those recommended herein, nor with $BF_3$ concentrations outside the range herein recommended. Liquid, substantially anhydrous hydrogen fluoride appears to function not only as a co-catalyst with $BF_3$ but also co-functions with $BF_3$ to produce a novel reaction solvent. Specific details of the present invention and properties of the novel compound 1,3,5-tri-t-butylbenzene will be presented hereinafter and illustrated by operating examples.

The charge stocks which we can employ are mono-t-butylbenzene, di-t-butylbenzenes or mixtures of these t-butylbenzenes. The feed may contain any one of the various isomers of di-t-butylbenzene or a mixture of two or all of these isomers. An inert solvent or diluent may be employed, for example a saturated hydrocarbon or hydrocarbon mixture, for example n-pentane, n-heptane, n-octane, petroleum ether, substantially saturated naphthas and the like. We prefer to operate in the substantial absence of inert diluents.

As has been mentioned above, HF functions both as a co-catalyst and co-solvent with $BF_3$ for the purposes of the present process. It is desired to employ a substantial molar excess of liquid substantially anhydrous hydrogen fluoride, for example the liquid anhydrous hydrogen fluoride of commerce, in the practice of the present process. Thus, we desire to employ not less than about 3 mols of HF per mol of the aromatic hydrocarbon charging stock; we can employ 10, 20, 50 or even more mols of HF per mol of the aromatic hydrocarbon charging stock. The upper limit on the proportion of HF to be employed is determined by considerations such as the expense of recovering HF and product from the reaction mixture and by the fact that extremely great dilution of the reaction mixture with liquid HF may tend to reduce the reaction rate somewhat. In general, the preferred range of HF concentrations is between about 5 and about 20 mols per mol of aromatic hydrocarbon charging stock.

One of the important features of the process of the present invention resides in the employment of $BF_3$ in proportions between about 0.3 and 0.6 mol per mol of t-butyl groups present in the aromatic hydrocarbon charging stock. This range of $BF_3$ usage corresponds to between about 0.3 and 0.6 mol per mol of mono-t-butylbenzene and between about 0.6 and 1.2 mols per mol of di-t-butylbenzenes in the feed to the process. The use of substantially smaller amounts of $BF_3$ sharply reduces the yield of the desired di- and tri-t-butylbenzenes and also increases the amount of undesired side-reactions, particularly the formation of isomers other than the desired meta-oriented compounds. More than the above amounts of $BF_3$ may be used; however, little if any effect on the course of the reaction results from the use of such larger amounts.

It is preferred to operate with about 0.4 mol of $BF_3$ per mol of t-butyl groups present in the feed to the process; or in terms of t-butylbenzenes: about 0.4 mol of $BF_3$ per mol of mono-t-butylbenzene and about 0.9 mol of $BF_3$ per mol of di-t-butylbenzene present in the feed.

Reaction temperatures should not exceed about +15° C. and preferably should be below about 0° C. The lowermost temperature limit will be dictated by considerations of the desired extent and rate of conversion of the charging stock; temperatures of about −100° C. or even lower appear to be employable, although they are relatively expensive to achieve and maintain. As will appear hereinafter, we have successfully employed the reaction temperature of −78° C. with good results. The preferred temperature range in which to effect the process of the present invention is between about 0° and about −30° C.

We have found that the length of time of contact in the reaction zone has little effect on the product obtained when the process is carried out at a temperature below about 0° C. Thus the contacting time may be as short as about 2 minutes and as long as about 50 hours.

When operating at a reaction temperature above 0° C. and particularly in the neighborhood of +15° C., excessively long contacting times should be avoided in order to eliminate side reactions and even cracking. While it is possible to operate at these higher temperatures with contact times on the order of 1 hour, it is preferred to use about 15 minutes or less. In general, the higher the temperature the shorter the contact time needed to avoid side reactions.

Sufficient pressure is employed within the reaction zone to maintain a liquid phase. Since the reaction temperatures are very low, the process of the present invention can readily be carried out at atmospheric or even lower pressures, although it will be apparent that superatmospheric pressures can be employed to prevent any substantial vaporization of the most volatile component in the reaction zone, viz. BF$_3$. In general, we may employ pressures between about 0.1 and about 50 p. s. i. a., the particular pressure being selected with reference to the reaction temperature for the purpose of maintaining substantially liquid phase conditions within the reaction zone.

Some of the results obtainable by the process of this invention, and some comparative examples, are presented in the tests set out below. These tests are illustrative only and do not delimit the present invention.

Test 1

A 500 ml. Monel reaction flask was charged with the following:

| | |
|---|---|
| p-Di-t-butylbenzene | 102.5 g. (0.54 mol) |
| n-Heptane | 260.5 g. |
| HF | 250.5 g. |

The mixture was cooled to −78° C. and BF$_3$ was added:

| | |
|---|---|
| BF$_3$ | 39 g. (0.574 mol) |

The molar ratio of BF$_3$ to di-t-butylbenzene was 1.04. The reaction flask was then placed in a bath of acetone, cooled with Dry Ice and shaken at −30° C. for 30 minutes. At the end of this reaction period, the reaction flask was placed in a bath at −78° C. and 300 cc. of water were added to the reaction mixture. An aqueous layer comprising HF and BF$_3$ hydrates and a water-immiscible supernatant layer of hydrocarbons, respectively, were separated and the hydrocarbon layer was washed with aqueous ammonia to remove retained acid materials. The total hydrocarbon recovery was 352 g. or 97 weight percent of the charge. The refractive index ($n_D^{20}$) of the entire reaction product was 1.4120. The reaction mixture was fractionated in a fractionating column containing the equivalent of 30 theoretical plates and the following product distribution was obtained (heptane-free basis):

| | Mol percent |
|---|---|
| Benzene | 14.7 |
| t-Butylbenzene | 20.7 |
| p-Di-t-butylbenzene | 0.0 |
| m-Di-t-butylbenzene | 12.6 |
| Higher boiling fraction | 52.0 |

Within the limit of error of infrared analysis, no para-di-t-butylbenzene was present in the reaction product mixture.

The "higher boiling" fraction was recrystallized from chloroform and ethanol and then characterized as follows:

| | |
|---|---|
| Boiling point, °C | 248±0.5 |
| Melting point, °C | +73 |
| Molecular weight (a) | 246 |
| Refractive index, $n_D^{20}$ (b) | 1.4825 |

Elementary analysis, wt. per cent:

| | |
|---|---|
| Carbon | 87.97 |
| Hydrogen | 12.45 | a Mass spectrometer determination.
b Extrapolated from the value in benzene solution.

This fraction was subsequently admixed with p-di-t-butylbenzene (M. P. 78° C.); the mixture had a melting point between 40° and 50° C. The depressing effect on the melting point of p-di-t-butylbenzene proves that this higher boiling fraction is not an impure p-di-t-butylbenzene, even though it has a melting point near that of p-di-t-butylbenzene.

An infrared spectograph of this fraction showed three meta-positioned hydrocarbon groups to be present. The elementary analysis and the molecular weight require this fraction to be a tri-tertiary-butylbenzene. The combined analysis establishes this fraction to be the new compound 1,3,5-tri-tertiary-butylbenzene.

Test 2

The following experiment illustrates the effect of a "high" temperature, as contrasted with low temperature, upon the conversion of butylbenzenes in the presence of liquid HF and BF$_3$.

A 500 ml. Monel flask was charged with

| | |
|---|---|
| t-Butylbenzene ($n_D^{20}$=1.4928) | 133 cc., 101.5 g. (0.858 mol) |
| HF | 132 cc., 132 g. |
| BF$_3$ | 27 g. (0.4 mol) |
| Mol BF$_3$/mol t-butylbenzene | 0.47 |

The reaction mixture was at about +22° C. when stirring was begun. As the reaction is exothermic, the temperature in the reactor quickly rose to about +45° C. and remained about there for the 10 minute contacting time and 5 minute settling time. The reaction mixture separated into two immiscible liquid phases, the upper phase comprising predominantly hydrocarbons and the lower phase comprising a solution of reaction products in liquid HF and BF$_3$. The weight of the immiscible hydrocarbon phase (mainly benzene and a small proportion of t-butylbenzene) was 15 g. and its refractive index ($n_D^{20}$) was 1.4950. The reaction flask also contained about 17.5 g. of gas which was given off after the liquid raffinate was separated. The weight of the lower acid-containing layer was 208 g. About 400 ml. of water were added to the acid layer, resulting in the separation of 43 g. of hydrocarbons ($n_D^{20}$, 1.4200) as a separate layer. The remaining aqueous phase was neutralized with KOH and the resulting solution was extracted to recover additional hydrocarbons. The hydrocarbons derived from the acid or extract layer were fractionally distilled with the following results:

| | Wt. Percent | Average $n_D^{20}$ |
|---|---|---|
| Benzene | 34 | 1.501 |
| Butylbenzene | 4 | 1.493 |
| 220–240° C. boiling range | 18 | 1.512 |
| 240–280° C. boiling range | 20 | 1.522 |
| 280° C.+ boiling range | 24 | 1.567 |

Practically all of the t-butylbenzene feed was converted to benzene and to other products having refractive indices higher than that of the alkylbenzenes expected in the above boiling ranges (average $n_D^{20}$, about 1.4850). It is apparent that the operation at this high temperature resulted in substantial hydrogen transfer and aromatic condensation reactions rather than the desired disproportionation reaction.

Test 3

The following charge was placed in a copper reaction flask:

| | |
|---|---|
| p-Di-t-butylbenzene | 100.5 g. (0.53 mol) |
| n-Heptane | 258.5 g. |
| HF | 272 g. |

The mixture was cooled to −78° C. and BF$_3$ was added in the amount of 55 g. (0.81 mol). The molar ratio of BF$_3$ to di-t-butylbenzene was 1.53. The reaction flask was shaken for about 15 minutes at about −78° C. and then allowed to stand at this temperature for an additional 75 minutes; then 400 cc. of water were added slowly to the Dry-Ice cooled reaction flask and a separation was made between aqueous acid phase and liberated hydrocarbons. The hydrocarbon recovery was 356 g. or 99.2 weight percent of the amount charged. The hydrocarbon reaction products were distilled in a fractionating column containing the equivalent of 30 theoretical plates with the following results (heptane-free basis):

| | Mol percent |
|---|---|
| Benzene | 8 |
| t-Butylbenzene | 24 |
| m-Di-t-butylbenzene | 8 |
| p-Di-t-butylbenzene | 20 |
| 1,3,5-tri-t-butylbenzene | 40 |

It will be noted that 80 mol percent of the charging stock was converted even at the very low temperature of −78° C.

Test 4

A copper reaction flask was charged with the following:

t-Butylbenzene _____ 204 g. (1.52 mols)
HF _____ 200 g.

The flask was cooled to −78° C. and BF₃ was added in the amount of 60 g. (0.88 mol). The molar ratio of BF₃ to t-butylbenzene was 0.58. The flask was agitated at 0° C. for 5 minutes and the reaction mixture was then added to 300 g. of ice in a Dry-Ice cooled copper flask. A hydrocarbon layer was liberated, separated, washed with water and dried. The hydrocarbon products were analyzed by fractional distillation as follows:

| | Mol percent |
|---|---|
| Benzene | 52 |
| t-Butylbenzene | 19 |
| m-Di-t-butylbenzene | 9 |
| 1,3,5-tri-t-butylbenzene | 20 |

It will be noted that the ratio of 1,3,5-tri-t-butylbenzene to 1,3-di-t-butylbenzene was about 2, whereas this ratio was about 4 in Test 1 in which p-di-t-butylbenzene was employed as a feed stock. It is believed that the larger amount of benzene present in the reaction mixture operated to increase the yield of 1,3-di-t-butylbenzene at the expense of 1,3,5-tri-t-butylbenzene.

Test 5

The following experiment, quite similar to the experiment of Test 4, illustrates the effects obtained with a low molar ratio of BF₃ to the aromatic hydrocarbon charging stock. A copper reaction flask was charged with the following:

t-Butylbenzene _____ 98.5 g. (0.68 mol)
HF _____ 135 g.

The mixture was cooled to −78° C. and BF₃ was added in the amount of 8 g. (0.12 mol). The molar ratio of BF₃ to t-butylbenzene was 0.18. The reaction flask was agitated at 0° C. for 30 minutes and the reaction mixture was then added to 200 g. of ice in a Dry-Ice cooled copper flask. The liberated hydrocarbon layer was separated, washed with water and dried. The hydrocarbon reaction products were then fractionally distilled with the following results:

| | Wt. percent |
|---|---|
| Benzene | 20 |
| t-Butylbenzene | 44 |
| 170–221° C. boiling range | 4 |
| 221–227° C. boiling range | 6 |
| 227–235° C. boiling range | 6 |
| 235–256° C. boiling range | 20 |
| | 100 |

It will be noted that no sharp fractionation plateaus were obtained corresponding to the boiling points of 1,3-di-t-butylbenzene and 1,3,5-tri-t-butylbenzene, clearly indicating that a mixture of isomers rather than the desired substantially pure hydrocarbons was produced. The t-butylbenzene conversion was only 56% as compared with 81% in Test 4 even though the reaction period was six times as long.

Test 6

A blend of 39 g. of 1,3,5-tri-t-butylbenzene in 312 g. of a virgin heavy naphtha (11.1 weight percent or 10.2 volume percent) was prepared and subjected to the CFR—R octane number test with the following results:

| | CFR-R | |
|---|---|---|
| | Clear | +3 cc. Tetraethyl lead per gal. |
| Heavy Naphtha | 30 | 54.4 |
| Blend of 1,3,5-tri-t-butylbenzene in heavy naphtha | 44.5 | 66.1 |

The calculated CFR—R blending octane number of 1,3,5-tri-t-butylbenzene is 173 (clear) and 171 (+3 cc. tetraethyl lead). The use of 1,3,5-tri-t-butylbenzene in aviation safety fuels as a high octane component is indicated.

It will be apparent that 1,3,5-tri-t-butylbenzene prepared by the present process may be employed as a charging stock for the preparation of numerous chemical derivatives.

Test 7

For comparative purposes, mono-normal-butylbenzene was treated with liquid HF–BF₃ agent. The reaction was carried out as described in tests above using essentially pure mono-n-butylbenzene as the aromatic charging stock.

| | |
|---|---|
| n-Butylbenzene | 100 g., 0.75 mol |
| HF | 240 g., 12.0 mols |
| HF, mols/mol feed | 16 |
| BF₃ | 136 g., 2.0 mols |
| BF₃, mols/mol feed | 2.7 |
| Temperature, ° C. | +5 |
| Contacting time, minutes | 30 |
| Product recovery, wt. percent | 92 |
| Product distribution, mol percent: | |
| Benzene | 7 |
| n-Butylbenzene | 85 |
| 1,3-di-n-butylbenzene | 8 |
| Higher | 0 |

Within the limits of infrared analysis, only the meta-isomer of di-n-butylbenzene appeared in the product mixture. Insofar as could be determined, the reaction had taken place without any isomerization of the n-butyl groups to other configurations, such as, secondary butyl or tertiary butyl.

The above test results are in striking contrast to the results shown in Test 4, wherein the predominant product was the tri-alkyl derivative.

It has been found that under the conditions of liquid HF and BF₃ usage described for t-butylbenzene disproportionation, mono-n-butylbenzene can be disproportionated cleanly to di-n-butylbenzene at temperatures between about −20° C. and about +75° C. However, at the higher temperatures short contact times are necessary in order to maintain a minimum production of the tri-n-butylbenzene; very short times may eliminate this formation. At temperatures above about 100° C. the amount of tri-n-butylbenzene produced increases with increase in temperature. In the neighborhood of +160° C. considerable cracking and other side reactions occur.

It has also been found that di-n-butylbenzene readily disproportionates to form tri-n-butylbenzene at temperatures above about −20° C. As the temperature of reaction increases, particularly at longer contact times, appreciable amounts of tetra-n-butylbenzenes are obtained. The formation of these higher butylbenzenes can be minimized by operating for very short contact times at temperatures below about +75° C.

Test 8

For comparative purposes, technical grade mono-secondary-butylbenzene was treated with liquid HF–BF₃ agent. The reaction was carried out as described in tests above.

| | | |
|---|---|---|
| Sec-butylbenzene (a) | mols | 1.2 |
| n-Butylbenzene (a) | do | 0.3 |
| HF, mols/mol feed | | 6 |
| BF₃, mols/mol feed | | 0.4 |
| Temperature, ° C. | | +26 |
| Time, minutes | | 5 |
| Product distribution, mol percent: | | |
| Benzene | | 37 |
| Sec-butylbenzene | | 22 |
| n-Butylbenzene | | 11 |
| 1,3-di-sec-butylbenzene | | (b) 19 |
| 1,3-di-n-butylbenzene | | (b) 4 |
| 1,3,5-tri-sec-butylbenzene | | 7 | a Infrared analysis.
b Calculated on basis that no tri-n-butylbenzene is formed under these conditions.

Within the limits of experimental error, no isomerization of the butyl groups occurred in this experiment. This test is in striking contrast with the t-butylbenzene experiments in that no cracking occurred at this temperature and in that only a small amount of the tri-alkyl derivative was formed.

It has been found that under the conditions of liquid HF and BF₃ usage described for the disproportionation of t-butylbenzene, mono-secondary-butylbenzene can be disproportionated cleanly to the di-secondary-derivative at temperatures below about 0° C. and to a mixture of the di-secondary- and tri-secondary-derivatives at temperatures between about 0° C. and +50° C. At temperatures near 0° C., the di-secondary derivative will be the predominant product even at prolonged contact time; at the higher temperatures, the tri-secondary derivative predominates at even short contact times. At temperatures above about +50° C., very short times must be used to avoid the formation of the tetra-secondary derivative and other side reactions such as cracking.

Di-secondary-butylbenzene can be disproportionated to mainly the tri-secondary-butylbenzene at temperatures below about +25° C. Above about +25° C., particularly at longer contact times, increasing amounts of the tetra-secondary derivative are formed. In order to reduce the side reactions of higher alkyl derivative formation and cracking, the reaction temperature should be below about +75° C.

Test 9

For comparative purposes, essentially pure mono-neopentylbenzene was treated with liquid HF–BF$_3$ agent.

| | |
|---|---|
| HF, mols/mol of feed | 8 |
| BF$_3$, mols/mol of feed | 1.15 |
| Temperature, ° C. | +5 |
| Contacting time, minutes | 10 |

Within the limits of experimental error, all the neopentylbenzene was recovered unchanged, i. e., at these conditions no disproportionation had occurred. This is most surprising, considering the ease with which t-butylbenzene, the butylbenzene analogue, disproportionated under these conditions.

This application is a continuation-in-part of our copending application Serial Number 182,612, filed August 31, 1950, now abandoned.

Thus having described the invention, what we claim is:

1. A process which comprises contacting a butylbenzene selected from the class consisting of mono-t-butylbenzene and di-t-butylbenzene with a substantial molar excess of liquid substantially anhydrous hydrogen fluoride and with at least about 0.3 mol of BF$_3$ per mol of t-butyl groups present in the charge to the contacting zone at a reaction temperature not exceeding about +15° C. under a pressure sufficient substantially to maintain the liquid phase, thereby producing a reaction mixture comprising 1,3-di-t-butylbenzene and 1,3,5-tri-t-butylbenzene.

2. The process of claim 1 wherein the BF$_3$ is present in an amount between about 0.3 and 0.6 mol per mol of t-butyl groups present in the charge to the contacting zone.

3. The process of claim 1 wherein the liquid HF is present in an amount between about 3 and 50 mols per mol of butylbenzene charged to the contacting zone.

4. The process of claim 1 wherein the reaction temperature is between about +15° and −100° C.

5. The process of claim 1 wherein the temperature is about +15° C. and the reaction time is about 15 minutes.

6. The process of claim 1 wherein the butylbenzene is mono-t-butylbenzene.

7. The process of claim 1 wherein the butylbenzene is di-t-butylbenzene.

8. The process of claim 7 wherein the di-t-butylbenzene is para-di-t-butylbenzene.

9. The process of claim 1 wherein the reaction is carried out in the presence of an inert, saturated liquid hydrocarbon.

10. A process for the disproportionation of a butylbenzene selected from the class consisting of mono-t-butylbenzene and di-t-butylbenzene, which process comprises contacting said butylbenzene under substantially anhydrous conditions with between about 5 and 20 mols of liquid HF per mol of said butylbenzene and with between about 0.3 and 0.6 mol of BF$_3$ per mol of t-butyl groups present in said butylbenzene at a temperature between about 0° and −30° C. for a time sufficient for the disproportionation reaction to take place, removing HF and BF$_3$ from the reaction product mixture and recovering 1,3,5-tri-t-butylbenzene and di-t-butylbenzene from said reaction product mixture.

11. The process of claim 10 wherein the time is at least about 2 minutes.

12. The process of claim 10 wherein said butylbenzene is mono-t-butylbenzene and the BF$_3$ present is between about 0.3 and 0.6 mol per mol of said mono-t-butylbenzene.

13. The process of claim 10 wherein said butylbenzene is di-t-butylbenzene and the BF$_3$ present is between about 0.6 and 1.2 mols per mol of said di-t-butylbenzene.

14. A process for the preparation of 1,3,5-tri-t-butylbenzene and essentially pure 1,3-di-t-butylbenzene, which process comprises contacting, under substantially anhydrous conditions, mono-t-butylbenzene with about 0.4 mol of BF$_3$ per mol of said butylbenzene and between about 5 and 20 mols of liquid HF per mol of said butylbenzene at a temperature between about 0° C. and −30° C. for between about 2 minutes and 50 hours, removing HF and BF$_3$ from the reaction product mixture and recovering 1,3,5-tri-t-butylbenzene and essentially pure 1,3-di-t-butylbenzene from said reaction product mixture.

15. A process for the preparation of 1,3,5-tri-t-butylbenzene and essentially pure 1,3-di-t-butylbenzene, which process comprises contacting, under substantially anhydrous conditions, para-di-t-butylbenzene with about 0.9 mol of BF$_3$ per mol of said butylbenzene and between about 5 and 20 mols of liquid HF per mol of said butylbenzene at a temperature between about 0° and −30° C. for between about 2 minutes and 50 hours, removing HF and BF$_3$ from the reaction product mixture and recovering essentially pure 1,3-di-t-butylbenzene and 1,3,5-tri-t-butylbenzene from said reaction product mixture.

References Cited in the file of this patent

UNITED STATES PATENTS

| | | |
|---|---|---|
| 2,480,939 | Lee et al. | Sept. 6, 1949 |
| 2,521,444 | Brooke et al. | Sept. 5, 1950 |
| 2,528,893 | Lien et al. | Nov. 7, 1950 |

OTHER REFERENCES

Smith, J. Am. Chem. Soc., vol. 56, pages 717–718 (1934).

Sidorova et al., Chem. Abs., vol. 43, col. 6582.3 (1949), 2 pages.